US012717015B2

(12) United States Patent
Reetz et al.

(10) Patent No.: US 12,717,015 B2
(45) Date of Patent: Aug. 25, 2026

(54) STEERABLE SONAR MOUNTING SYSTEM

(71) Applicant: Garmin International, Inc., Olathe, KS (US)

(72) Inventors: Adam E. Reetz, Olathe, KS (US); Chad D. DeConink, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 0 days.

(21) Appl. No.: 18/917,452

(22) Filed: Oct. 16, 2024

(65) Prior Publication Data

US 2025/0123383 A1 Apr. 17, 2025

Related U.S. Application Data

(60) Provisional application No. 63/590,921, filed on Oct. 17, 2023.

(51) Int. Cl.
*G01S 15/00* (2020.01)
*B63B 79/10* (2020.01)
*G01S 7/521* (2006.01)
*G01S 15/96* (2006.01)

(52) U.S. Cl.
CPC .............. *G01S 7/521* (2013.01); *G01S 15/96* (2013.01)

(58) Field of Classification Search
None
See application file for complete search history.

(56) References Cited

U.S. PATENT DOCUMENTS

| | | | | |
|---|---|---|---|---|
| 9,322,915 | B2 | 4/2016 | Betts et al. | |
| 9,459,350 | B2 | 10/2016 | Betts et al. | |
| 10,107,908 | B2 | 10/2018 | Betts et al. | |
| 10,281,576 | B2 | 5/2019 | DePasqua | |
| 11,217,216 | B2 | 1/2022 | Vance | |
| 11,370,516 | B2 | 6/2022 | Ridl | |
| 11,536,820 | B2 | 12/2022 | Wigh et al. | |
| 11,694,667 | B2 | 7/2023 | Vance | |
| 2005/0257418 | A1* | 11/2005 | Merline | A01K 91/02 43/26.2 |
| 2022/0373662 | A1 | 11/2022 | Crawford et al. | |
| 2022/0373678 | A1 | 11/2022 | Combs et al. | |
| 2023/0047381 | A1 | 2/2023 | Vance | |
| 2024/0359780 | A1* | 10/2024 | Schroeder | G01S 15/96 |

* cited by examiner

*Primary Examiner* — John F Mortell
(74) *Attorney, Agent, or Firm* — Samuel M. Korte; Max M. Ali; Kathleen D. Fitterling

(57) ABSTRACT

A steerable sonar mounting system comprises a sonar transducer, a gesture remote, and a motorized steering unit. The gesture remote includes a sensor, a memory, and a processor coupled to both the memory and the sensor. The processor is configured to receive a user command for repositioning the sonar transducer based on the movement of the gesture remote, determine a corresponding gesture movement using data from the sensor, and transmit an indication of the gesture movement. The motorized steering unit is coupled to the sonar transducer and communicatively linked to the gesture remote, where the motorized steering unit is configured to move the sonar transducer in response to receiving the transmitted indication of the gesture movement.

15 Claims, 12 Drawing Sheets

STEERABLE SONAR MOUNTING SYSTEM

RELATED APPLICATIONS

This application claims priority to U.S. provisional application 63/590,921 filed Oct. 17, 2023, the contents of which are hereby incorporated by reference herein for all purposes.

BACKGROUND

A sonar transducer can be mounted to a marine vessel (e.g., boat, ship, sailboat, or other watercraft). The sonar transducer can be used to find and identify fish. Often, the direction the sonar transducer is pointed in is manually positioned by an angler. And, in some instances, the sonar transducer can be mounted to a trolling motor or a pole. But it's often cumbersome for a fisherman to orient the transducer in a desired direction.

BRIEF DESCRIPTION OF THE DRAWINGS

The detailed description references the accompanying figures. The use of the same reference numbers in different instances in the description and the figures may indicate similar or identical items. In addition, the proportion and the relative scale of the elements provided in the figures are intended to illustrate various embodiments of the present disclosure and are not to be used in a limiting sense.

DETAILED DESCRIPTION

The present disclosure includes a steerable sonar mounting system comprising a sonar transducer, a gesture remote, and a motorized steering unit. The gesture remote includes a sensor, a memory, and a processor. The processor is configured to receive a user command for the sonar transducer to point in a same direction as the gesture remote, determine a gesture direction the gesture remote is pointing (or other gesture movement) in based on data from the sensor in response to the user command, and transmit an indication of the gesture movement. The motorized steering unit coupled to the sonar transducer and communicatively coupled to the gesture remote is configured to point the sonar transducer in the gesture direction in response to receiving the gesture direction.

As sonar transducers become more popular and widespread, anglers are finding new ways to mount the sonar transducer so they can scan and catch more fish. Independent mounts, sperate from a trolling motor shaft, enable anglers to control the direction the sonar transducer is pointing in no matter the direction of the trolling motor. While both hand control and motorized mounts offer anglers independent control over the sonar transducer, they each lack system integration capabilities. Further, they often must be tediously and manually positioned in a desired direction relative to the angler, which can complicate and distract from fishing. A steerable sonar mounting system is described herein to enable anglers to easily orient their sonar systems in a desired direction without having to reorient a trolling motor or manually position a pole.

Figure 1:
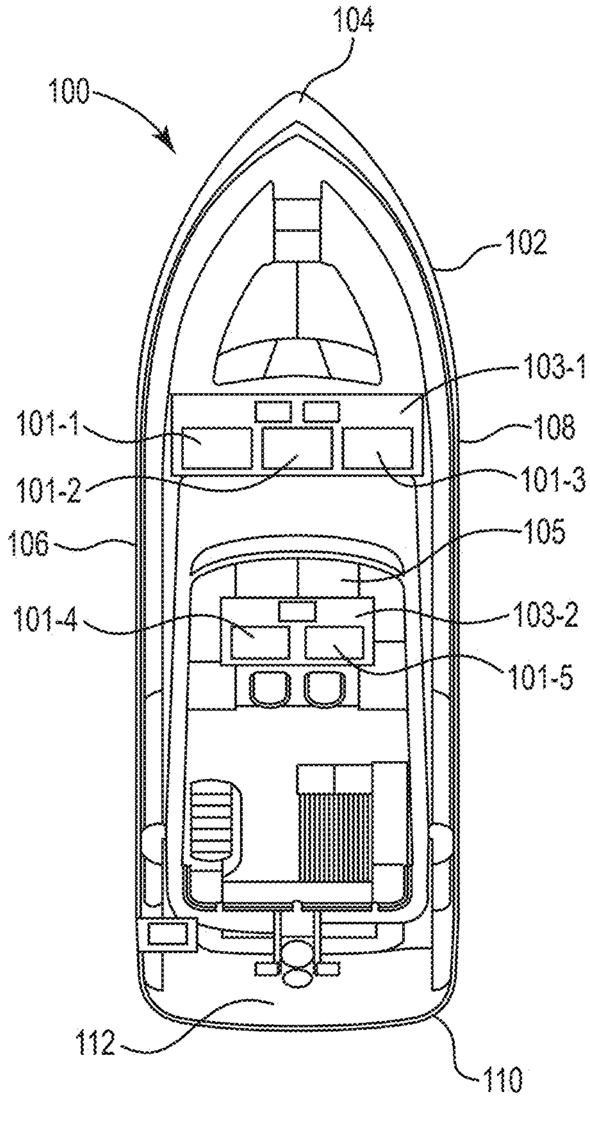
FIG. 1 is a top view of a marine vessel that can employ a steerable sonar mounting system.

FIG. 1 is a top view of a marine vessel 100 that can employ a steerable sonar mounting system. The marine vessel 100 can include a hull 102, a bow 104, a starboard side 108, a port side 106, a stern 110, and/or a transom 112. The hull 102 can be a portion of the marine vessel 100 below the surface of the water. The bow 104 can be a front portion of the marine vessel 100 and the stern 110 and/or transom 112 can be a rear portion of the marine vessel 100. The starboard side 108 is the right side of the marine vessel 100 when facing the bow 104 and the port side 106 is the left side of the marine vessel 100 when facing the bow 104.

The marine vessel 100 can include a marine vessel display system 105. The steerable sonar mounting system can be configured to communicate with the marine vessel display system 105. For example, the steerable sonar mounting system can be communicatively coupled (e.g., wired or wirelessly connected) to the marine vessel display system 105. The marine vessel display system 105 may be mounted in a marine vessel 100. The marine vessel display system 105 may assist operators of the marine vessel 100 in monitoring information related to the operation of the marine vessel 100. For example, the marine vessel display system 105 may be configured as a chart plotter or fish finder.

The marine vessel display system 105 can employ a plurality of independent displays 101-1, 101-2, 101-3, 101-4, and 101-5. Two or more of the displays 101-1, . . . , 101-5 may be mounted proximate (e.g., adjacent) to one another to form one or more display stations 103-1 and 103-2 in the marine vessel 100. For example, three displays 101-1, 101-2, and 101-3 may be mounted together to form a first display station 103-1 in a first area of the marine vessel 100 and two other displays 101-4 and 101-5 may be mounted together to form a second display station 103-2 in a second area of the marine vessel 100. The marine vessel display system 105 may also include additional displays 101 grouped into one or more additional display stations. The embodiments described herein and shown in the figures are example implementations of the technology; however, it is contemplated that any number of displays 101 and/or display stations 103 can be employed by the marine vessel display system 105.

Figure 2:
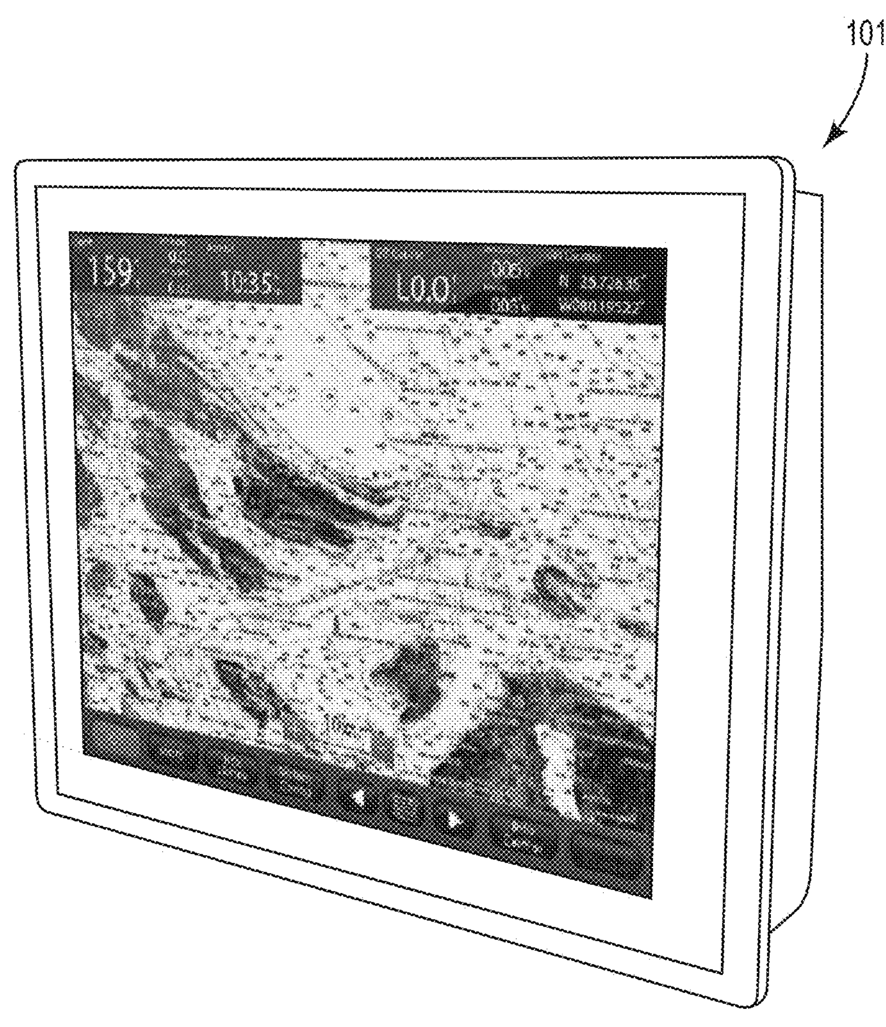
FIG. 2 is a perspective view of a display for viewing one or more underwater image streams.

FIG. 2 is a perspective view of a display 101 for viewing one or more underwater images. Display 101 can correspond to one of the number of displays 101-1, . . . , 101-5 in FIG. 1. The display 101 can display text, data, graphics, images, and other information, including those generated by sonar.

The display 101 may be a liquid crystal display (LCD), light-emitting diode (LED) display, light-emitting polymer (LEP) display, thin film transistor (TFT) display, gas plasma display, or any other type of display. The display 101 may be backlit such that it may be viewed in the dark or other low-light environments. The display 101 may be of any size and/or aspect ratio, and in one or more embodiments, may be 15 inches, 17 inches, 19 inches, or 24 inches measured diagonally. In some embodiments, the display 101 may include a touchscreen display. The touchscreen display may employ any touchscreen technology, including, but not limited to, resistive, capacitive, or infrared touchscreen technologies, or any combination thereof.

User commands can be received via display 101. For example, a steerable sonar mounting system can point a sonar transducer in a particular direction in response to a user selecting a button shown on display 101.

The display 101 can show moving images including objects that are in the water around the marine vessel. An underwater image stream can be shown individually on the display 101 or simultaneously with another underwater image stream being shown on a separate section of the display 101. An underwater image stream can be generated from data derived from electronic signals output by a sonar transducer. The sonar transducer can transmit a sonar beam that reflects off objects in the water and returns to the transducer which outputs the corresponding electronic signal. Thus, in terms of the relationship between the underwater image stream and the sonar beam, the view of the underwater image stream is the underwater volume covered by the sonar beam.

In a number of embodiments, the user has the ability, through an interface on the display 101, to rotate the sonar transducer independently about a vertical axis so that a direction in which the sonar beam is pointed can be changed. Or, in some systems, the user may manually rotate or otherwise position the sonar transducer in a desired direction or orientation. However, manually rotating the sonar transducer while holding a fishing rod or steering the marine vessel while monitoring the display 101 can be cumbersome.

The steerable sonar mounting system of the present technology provides improved performance that allows the user to view an underwater image stream that matches a gesture direction a gesture remote is pointed in or otherwise be automatically controlled by the user, system 105, or other components on the vessel 100. Thus, the user would not need to manually rotate the sonar transducer.

Figure 3A:
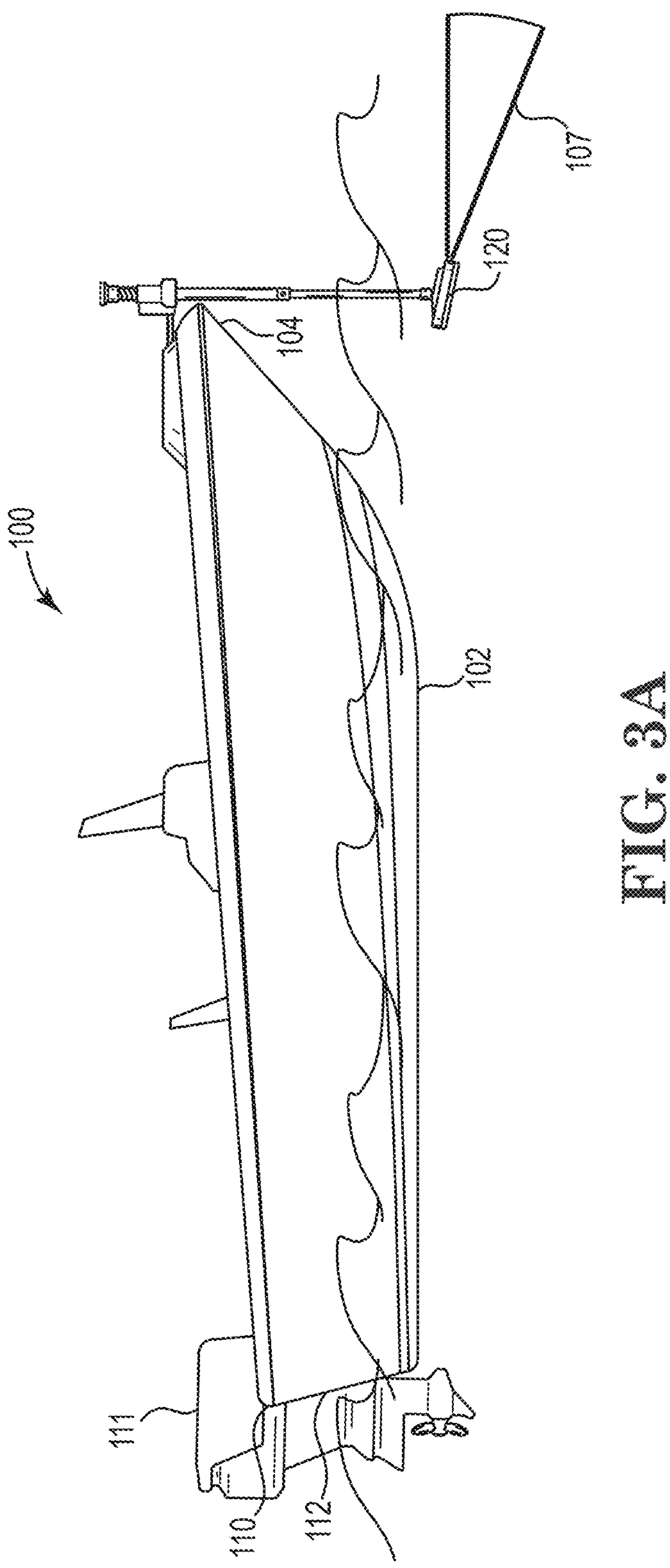
FIG. 3A is a side view of a marine vessel including a sonar transducer.
Figure 3B:
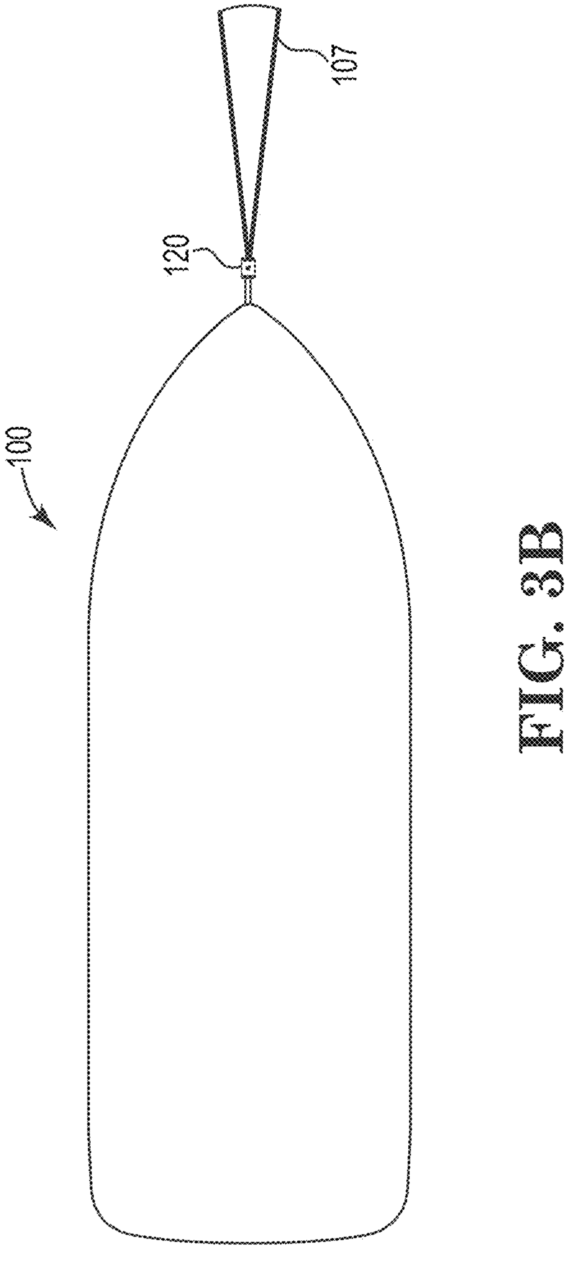
FIG. 3B is a top profile view of a marine vessel including a sonar transducer.

FIG. 3A is a side view of a marine vessel 100 including a sonar transducer 120. FIG. 3B is a top profile view of the marine vessel 100 including the sonar transducer 120. Marine vessel 100 can correspond to marine vessel 100 in FIG. 1.

The sonar transducer 120 can be mounted to the marine vessel 100. As previously described in connection with FIG. 2, the sonar transducer 120 can transmit a sonar beam 107 that reflects off of objects in the water and returns to the sonar transducer 120 which outputs the corresponding electronic signal. For example, the sonar beam 107 can reflect off surfaces, such as a bottom of a body of water, fish, and/or underwater structures. Sonar transducer 120 can be configured as a scanning transducer, a conical beam transducer, a phased-array transducer, a frequency-steered transducer, combinations thereof, and the like. Various example transducer configurations that may be employed by sonar transducer 120 are described in U.S. Pat. No. 10,890,660 and U.S. Patent Application Publication No. US20200072953A1, each of which is incorporated herein by specific reference in their entirety. The control functionality described herein, in which the sonar transducer 120 can be easily positioned to insonify desired volumes of water surrounding the vessel, is particularly useful with real-time sonar systems that generate live images, such as Garmin® Livescope® and Garmin® Panoptix®, The marine vessel 100 can further include a motor 111. The motor 111 can be mounted to a stern (e.g., stern 110 in FIG. 1) of the marine vessel 100, as illustrated in FIG. 3A. However, the motor 111 can be mounted to any portion of the marine vessel 100. The motor 111 can be a trolling motor, a thruster, and/or a propulsion motor. The motor 111 can provide port-to-starboard, starboard-to-port, bow-to-stern, and/or stern-to-bow propulsion. This can move the marine vessel 100 forward or backward and/or turn or spin the marine vessel 100.

Figure 4:
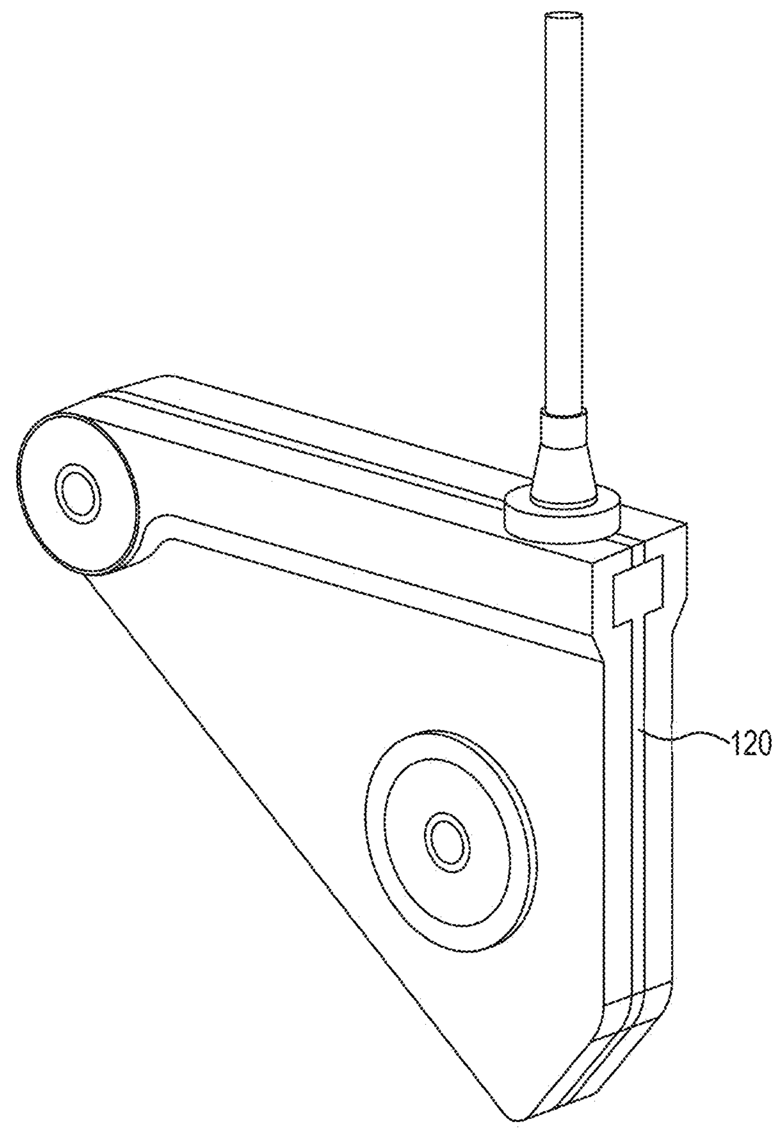
FIG. 4 is a perspective view of a sonar transducer.

FIG. 4 is a perspective view of a sonar transducer 120. As previously described, the sonar transducer 120 can transmit a sonar beam that reflects off of objects in the water and returns to the sonar transducer 120 which outputs the corresponding electronic signal.

Figure 5:
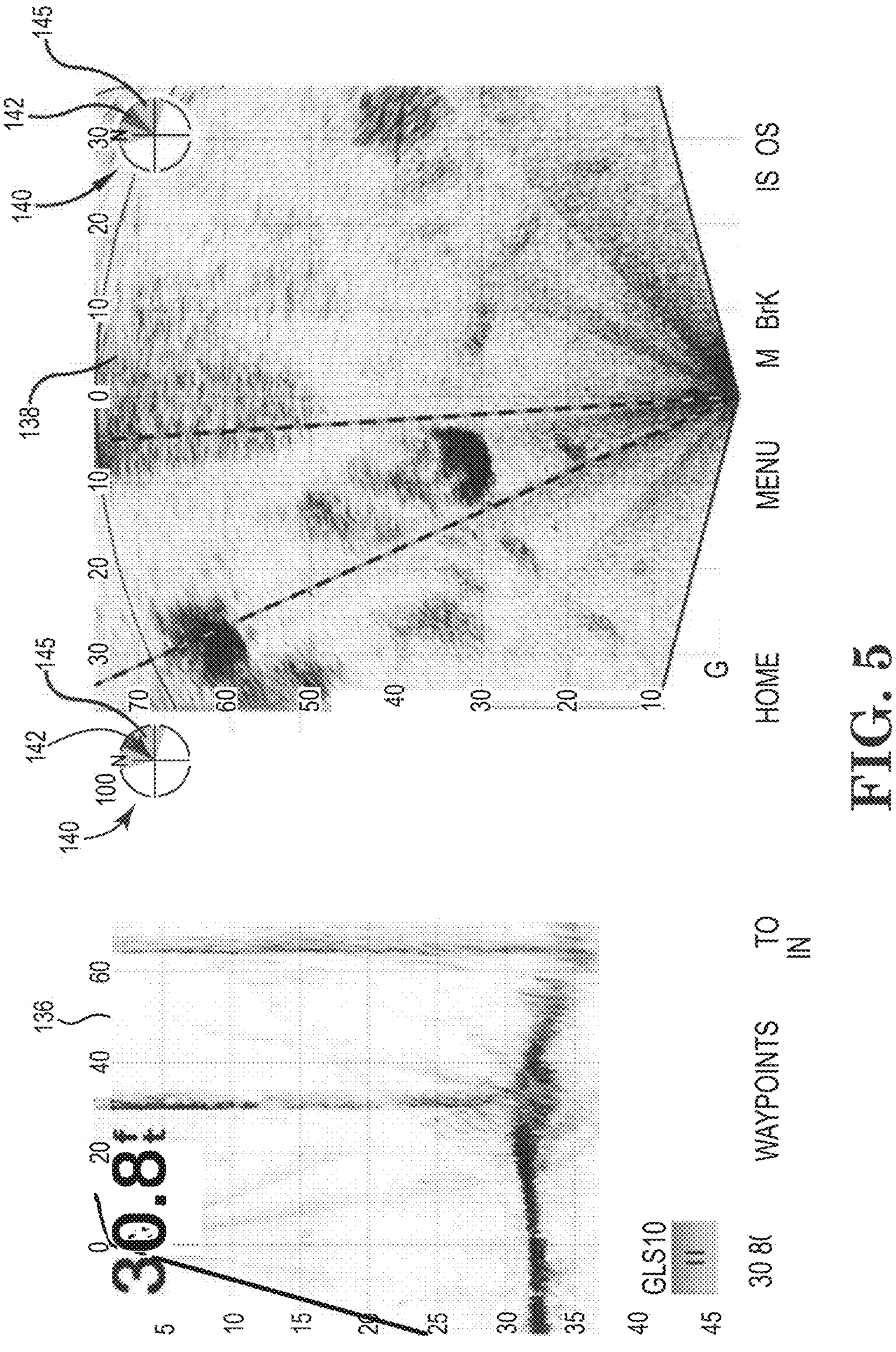
FIG. 5 illustrates a number of underwater image streams.

FIG. 5 illustrates a number of underwater image streams 136 and 138. The number of underwater image streams 136 and 138 can be shown, simultaneously or individually, on a display (e.g., display 101 in FIG. 2). In a number of embodiments, each underwater image stream 136 and 138 can be shown in one of a plurality of sections of the display. In some examples, each underwater image stream 136 and 138 can be shown in a split screen configuration. In other examples, each underwater image stream 136 and 138 can be separately presented and toggled between by the user to present any desired views of the underwater image streams 136 and 138.

The display may show a first underwater image stream 136 in a first section of the display and a second underwater image stream 138 in a second section of the display. Each underwater image stream 136 and 138 is a representation of the objects in the water and the bottom of the body of water from a particular viewpoint. For example, the first underwater image stream 136 is a representation of the objects in the water and the bottom of the body of water as seen from a viewpoint looking at a side of a marine vessel (e.g., marine vessel 100 in FIGS. 1, 3A, and 3B). The second underwater image stream 138 is a perspective view and is a representation of the objects in the water as seen from a viewpoint at the surface of the water looking downward into the water.

Each of the underwater image streams 136 and 138 can be generated from reflections of a sonar beam (e.g., sonar beam 107 in FIGS. 3A and 3B). In addition, each underwater image stream 136 and 138 can include a numbered XY grid. In the first underwater image stream 136, the spaced-apart lines along the horizontal X-axis indicate a horizontal distance in the water with the numbers indicating the distance values in units of feet. The spaced-apart lines along the vertical Y-axis indicate a vertical distance in the water with the numbers indicating the distance values in units of feet.

In the second underwater image stream 138, the spaced-apart lines along the X-axis indicate a distance left and right (e.g., to port and to starboard) from the sonar transducer in the water with the numbers indicating the distance values in units of feet. The spaced-apart lines along the Y-axis indicate a distance forward from the sonar transducer in the water with the numbers indicating the distance values in units of feet.

The display can be further configured to show a pictogram 140 that includes a polar plot of representations of a first sonar beam from a first sonar transducer and/or a second sonar beam from a second sonar transducer. The axes of the polar plot are the geographic or magnetic north-south axis and the geographic or magnetic east-west axis. The origin of the polar plot is the location of the sonar transducer. The pictogram 140 includes a first wedge icon 142 representing a first sonar beam being generated from the origin and a second wedge icon 145 representing a second sonar beam also being generated from the origin. The first wedge icon 142 has the same shape and relative dimensions as the first sonar beam and the second wedge icon 145 has the same shape and relative dimensions as the second sonar beam. The first wedge icon 142 is positioned within the second wedge icon 145 at the same relative rotation angle as the first sonar beam is to the second sonar beam. In addition, the first wedge icon 142 and the second wedge icon 145 are each positioned on the polar plot at a geographic directional angle that varies according to the geographic directional angle of each of the first sonar beam and the second sonar beam. The display may include a pictogram 140 positioned on the first underwater image stream 136 and a pictogram 140 positioned on the second underwater image stream 138.

However, the pictogram 140 may take any form that allows the user to easily identify the relative orientation of the transducers. The pictogram 140 may be displayed independently of, and separate from, the image streams to allow the user to adjust the orientation of the one or more transducers from any portion of the user interface. The pictogram 140 may use any simplified shape or graphic to indicate the coverage of each beam generated by the transducers. The display may additionally be configured to show a plurality of menu icons that allow the user to control the operation of the display by touching the menu icons on the screen.

The pictogram 140 may further be configured to display the heading of the marine vessel in addition to the directional representation of the sonar beams. This allows the user to easily orient the direction of the sonar transducer 120 relative to the vessel's heading. The heading of the marine vessel can be represented as a separate marker on the polar plot, providing a visual reference for the alignment between the sonar transducer 120 and the vessel's current heading. By integrating both the sonar beam directions and the vessel's heading into the same pictogram 140, the user is able to more effectively assess the spatial orientation of the sonar beams relative to the vessel's course.

The information regarding the heading of the marine vessel, sonar beams, and the user or fishing rod may also be conveyed using multiple pictograms or other images, rather than a single, integrated pictogram 140. Each heading or directional element can be displayed separately in distinct pictograms or graphical representations. These headings can also be shown on a map display, charts, sonar displays, or other display elements, allowing the user to view the directional information in different contexts within the user interface.

Figure 6:
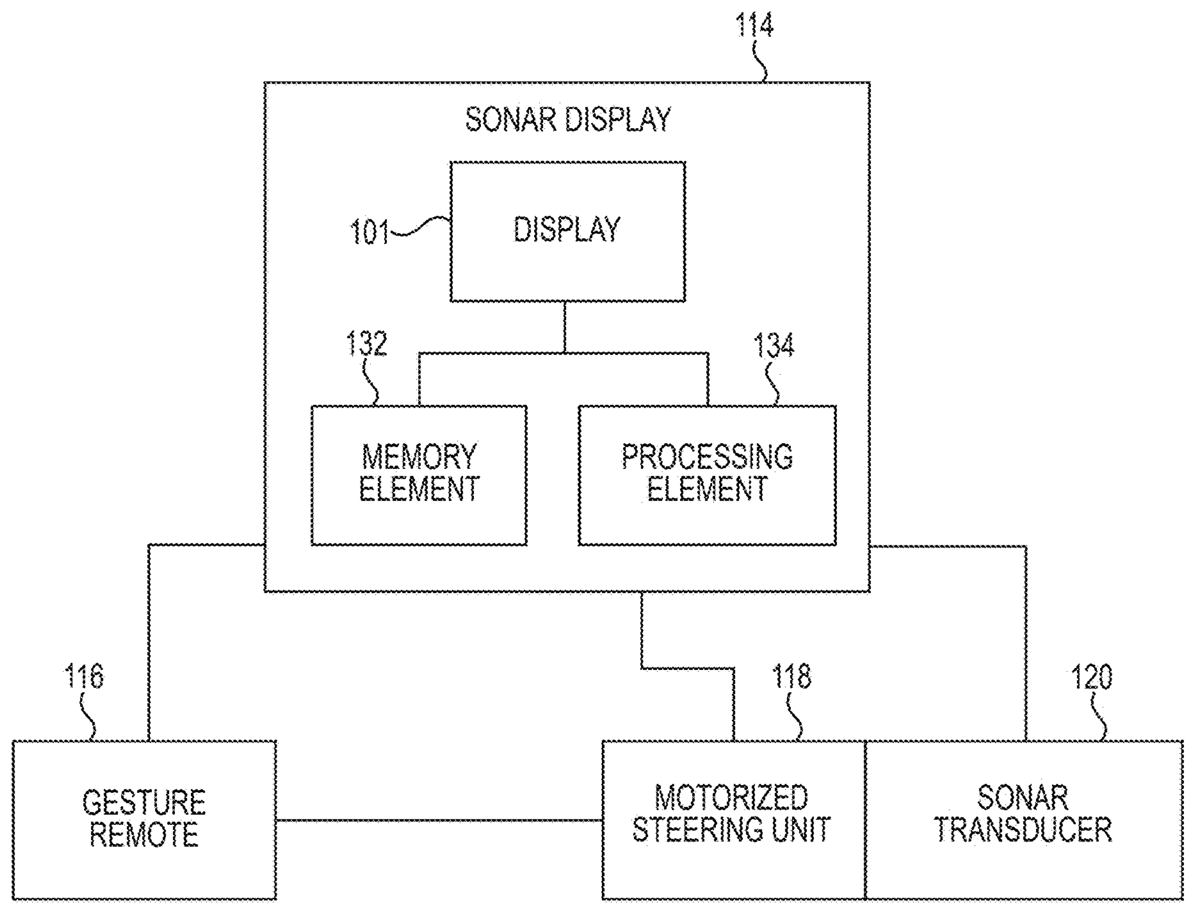
FIG. 6 is a block diagram illustrating a sonar display coupled to a motorized steering unit, a sonar transducer, and a gesture remote.

FIG. 6 is a block diagram illustrating a sonar display 114 coupled to a motorized steering unit 118, a sonar transducer 120, and a gesture remote 116. The sonar display 114 may broadly comprise a display 101, a memory element 132, and a processing element 134. However, in some configurations, the sonar display 114, memory element 132, and processing element 134 may be independent of each other. For example, in various embodiments, processing element 134 may be integrated with a sonar transducer 120, the gesture remote 116, and/or the motorized steering unit 118 to provide the functionality described herein. Similarly, functionality provided by the processing element 134 may be distributed among processors found within the sonar transducer 120, the gesture remote 116, the motorized steering unit 118, and/or the sonar display 114. That is, some functions may be performed by a portion of the processing element 134 within sonar transducer 120, while other functions may be performed by a portion of the processing element 134 within the sonar display 114, the gesture remote 116, and/or the motorized steering unit 118.

The sonar display 114 may further comprise electronic circuitry such as wireless communication components, signal processing components, amplifiers, filters, analog to digital converters (ADCs), digital to analog converters (DACs), and the like, which will not be discussed in detail in this document. In addition, the sonar display 114 includes a housing which retains the previously-listed components. Furthermore, the sonar display 114 may include a plurality of pushbuttons, knobs, switches, or the like, that are mounted on one or more of the walls of the housing and act as a user interface. The user interface allows the user to control the operation of the display 101.

The display 101 may include technology of the following types: plasma, light-emitting diode (LED), organic LED (OLED), Light Emitting Polymer (LEP) or Polymer LED (PLED), liquid crystal display (LCD), thin film transistor (TFT) LCD, LED side-lit or back-lit LCD, heads-up displays (HUDs), or the like, or combinations thereof. The display 101 may possess any one of a variety of shapes, such as a square or a rectangular aspect ratio that may be viewed in either a landscape or a portrait mode. In various embodiments, the display 101 may also be a touch screen that allows the user to interact with the sonar display 101 by physically touching, swiping, or gesturing on areas of the display 101. The display 101 may be in electronic communication with the memory element 132 and the processing element 134 and may receive data or information therefrom that is to be shown on the display 101. The display 101 may also receive data or information that is input by touching the display 101 and output the data or information to the memory element 132 and the processing element 134.

The memory element 132 may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, solid state memory, or the like, or combinations thereof. In some embodiments, the memory element 132 may be embedded in, or packaged in the same package as, the processing element 134. The memory element 132 may include, or may constitute, a non-transitory "computer-readable medium". The memory element 132 may store the instructions, code, code statements, code segments, software, firmware, programs, applications, apps, services, daemons, or the like that are executed by the processing element 134. The memory element 132 may also store data that is received by the processing element 134 or the device in which the processing element 134 is implemented. The processing element 134 may further store data or intermediate results generated during processing, calculations, and/or computations as well as data or final results after processing, calculations, and/or computations. In addition, the memory element 132 may store settings, text data, documents from word processing software, spreadsheet software and other software applications, sampled audio sound files, photograph or other image data, movie data, databases, and the like.

The processing element 134 may comprise one or more processors found within sonar transducer 120, gesture remote 116, motorized steering unit 118, and/or sonar display 114. The processing element 134 may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element 134 may generally execute, process, or run instructions, code, code segments, code statements, software, firmware, programs, applications, apps, processes, services, daemons, or the like. The processing element 134 may also include hardware components such as registers, finite-state machines, sequential and combinational logic, configurable logic blocks, and other electronic circuits that can perform the functions necessary for the operation of the current invention. In certain embodiments, the processing element 134 may include multiple computational components and functional blocks that are packaged separately but function as a single unit. In some embodiments, the processing element 134 may further include multiprocessor architectures, parallel processor architectures, processor clusters, and the like, which provide high performance computing. The processing element 134 may be in electronic communication with the other electronic components of the sonar display 114 or system generally through serial or parallel links that include universal busses, address busses, data busses, control lines, and the like. In some configurations, processing element 134, or portions thereof, may be integrated in the same housing as sonar transducer 120, gesture remote 116, and/or motorized steering unit 118 to provide the functions described herein.

The processing element 134 may be operable, configured, or programmed to perform the following functions, processes, or methods by utilizing hardware, software, firmware, or combinations thereof. Other components, such as the memory element 132 may be utilized as well.

The processing element 134 generally controls the display 101 to show the features described above including, but not limited to, an underwater image stream (e.g., underwater image streams 136 and 138). The processing element 134 outputs a command to transmit an electronic signal to the sonar transducer 120 which in turn, transmits a sonar beam. The processing element 134 receives an electronic signal from the sonar transducer 120. The processing element 134 processes the received electronic signal and generates data for an underwater image stream to be displayed on the display 101. Such processing may occur within the sonar transducer 120, the gesture remote 116, the motorized steering unit 118, the sonar display 114, and/or other portions of the system. In addition, the processing element 134 updates the data sets for the underwater image stream in near real time as the characteristics of the received electronic signal changes as a result of changes in the reflections of the sonar beam. Furthermore, the data set is communicated to the display 101.

The processing element 134 receives input from the user, either from the user touching the display 101, from the user utilizing interface features such as the pushbuttons, and/or from the user moving the gesture remote 116 or selecting buttons on the gesture remote 116 to rotate the sonar transducer 120. The processing element 134 outputs a transducer rotation electronic signal that is received by the motorized steering unit 118. The processing element 134 sets the analog level or digital data value of each transducer rotation electronic signal according to the input from the user. The rotation of the sonar transducer 120 can also change the rotation angles of the sonar beam, which changes the perspectives of the views of the underwater image stream.

The processing element 134 may receive an electronic signal from a magnetometer or digital electronic compass whose analog electric voltage or electric current level or digital data value varies according to a geographic direction and/or a magnetic direction. The processing element 134 may determine the direction the gesture remote 116 is pointing in from the electronic signal.

The processing element 134 generates data for a pictogram (e.g., pictogram 140 in FIG. 5) to be displayed on the display 101. The processing element 134 may have stored or received data that includes values for the first rotation angle and the second rotation angle of the sonar transducer 120. In some configurations, the sonar transducer 120 and/or the motorized steering unit 118 may include sensors, such as a magnetometer, an accelerometer, a gyroscope, a global navigation satellite system (GNSS) receiver, an inertial measurement unit, and/or a compass, that generate attitude, position, and/or heading information that may be provided to the processing element 134 to determine the relative orientation of the sonar beam for generation of the display described herein.

Figure 7:
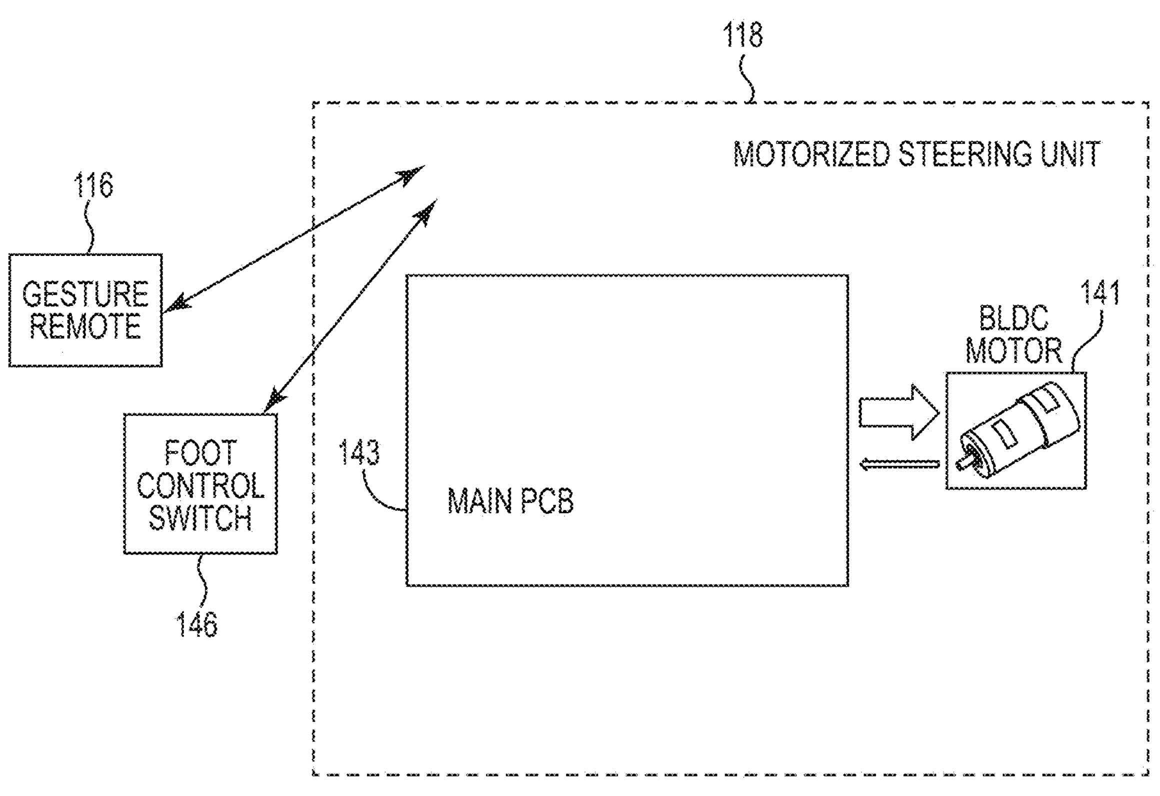
FIG. 7 is a block diagram illustrating a motorized steering unit.

FIG. 7 is a block diagram illustrating a motorized steering unit 118. The motorized steering unit 118 can be considered the "main housing" component with its focus being a motorized, rotating vertical shaft for controlling a sonar transducer (e.g., sonar transducer 120 in FIG. 6). The motorized steering unit 118 can be mountable to a trolling motor or to a marine vessel (e.g., marine vessel 100 in FIGS. 1, 3A, 3B).

The sonar transducer can be fixed mounted to a shaft of the motorized steering unit 118. The motorized steering unit 118 can rotate and steer the sonar transducer and can be controlled by the gesture remote 116, foot control switch 146, or display (e.g., display 101 in FIGS. 2 and 6). The motorized steering unit 118 can be controlled by a motor 141.

In certain embodiments, the motor 141 is a brushless direct current (DC) motor. The motor and drive mechanism are mounted on the top or upper half of the shaft, while the sonar transducer 120 is mounted toward the bottom of the shaft. The motorized steering unit 118 includes a waterproof die-cast housing that encloses the motor 141, the drive mechanism, and the main printed circuit board (PCB) 143. The placement of the motor and drive mechanism on the upper half of the shaft allows for connection to the motorized steering shaft, which controls the rotation of the shaft.

The drive mechanism consists of a combination of gears and a DC gearmotor that automatically drives the motorized steering shaft. The lower portion of the shaft is configured to support the sonar transducer 120, which is mounted near the bottom. The drive mechanism enables independent rotation of the shaft and the sonar transducer 120 based on commands from the motorized steering unit 118. This arrangement separates the motor and drive components from the sonar transducer along the length of the shaft.

The motorized steering unit 118 can be implemented as a stand-alone pole mounted to the vessel's gunnel, transom, or another location on the boat. This configuration allows for flexible placement of the sonar transducer 120 without requiring integration with other systems on the vessel. The pole can be designed to be removable, allowing for easy reuse and replacement as needed. The removable nature of the stand-alone pole provides convenience for users who may want to transfer the motorized steering unit 118 between different vessels or storage when not in use.

Additionally, the motorized steering unit 118 can be attached directly to the trolling motor, enabling independent rotation of the sonar transducer 120 apart from the trolling motor itself. This setup eliminates the need for an independent mounting location on the boat, as the sonar transducer 120 can be controlled separately from the movement of the trolling motor. The independent rotation allows the sonar transducer 120 to maintain a fixed or desired orientation regardless of the trolling motor's steering or propulsion actions.

In addition, or as an alternative to, direct mounting to the trolling motor, the motorized steering unit 118 can indirectly attach to the trolling motor, through one or more intermediate mounts or attachments devices. For instance, the motorized steering unit 118 can attach to any portion of the trolling motor or its mounting system to reutilize components used to position and hold the trolling motor with respect to the marine vessel.

The steerable sonar mounting system can employ a foot control switch 146 to enable the angler to position the sonar transducer with his or her feet, without having to manually rotate the steerable sonar mounting system and sonar transducer with his or her hands. The wireless foot control switch 146 can allow the user to control the rotating direction of the sonar beam, "hands-free" by transmitting data from the foot control switch 146 to the motorized steering unit 118 via wireless communication such as Bluetooth and/or Bluetooth Low Energy (BLE). For example, the user can press a directional button with their foot in order to control the motor 141 and rotate the position of the sonar transducer, relative to the marine vessel. In some examples, the wireless foot control switch 146 can also include two other user-programmable buttons for added functional control to work in conjunction with a gesture remote 116. The foot control switch 146 can be powered by batteries (e.g., AA batteries) and include an indicator (e.g., LED) that can show feedback status to the user.

The steerable sonar mounting system can employ the gesture remote 116 to position the motorized steering unit 118 independent of the foot control switch 146, manual controls, or the display via wireless communication. The gesture remote 116 allows the motorized steering unit 118 to be controlled based on natural movements of the angler to minimize fishing distractions.

The gesture remote 116 can include three buttons that can control a sonar beam. For example, the gesture remote 116 can include a large button for activating the gesture remote 116 and two smaller programmable buttons. An LED can also be included on the gesture remote 116 for showing feedback status to the user. In some examples, the gesture remote 116 can be powered by a coin cell battery.

The gesture remote 116 can be used with several optional accessories and can use a quick attach clip system to be moved from accessory to accessory, such as, a fishing rod attachment, a hat clip, and/or a remote holder with lanyard.

The gesture remote 116 can be used in various ways by the user (e.g., angler) to orient the motorized steering unit 118 and its attached sonar transducer. When the gesture remote 116 is mounted to the user's fishing rod, the user can press the activate button and the sonar transducer will point in a rod direction, which is the same direction as the rod is pointing in. This is particularly useful to help the beamwidth of the sonar beam capture the user's lure and nearby fish to ensure that targets are not lost as the user reels and casts.

Further, the user can press the activate button and rotate the rod in a roll rotation of the gesture remote 116, like twisting a screwdriver, to get the motorized steering unit 118 to rotate the sonar transducer corresponding to the rolling movement. In a number of embodiments, the user can press the activate button and turn the rod. Similarly, in a yaw mode, the user may yaw the fishing rod (pivoting the direction of its tip) to cause the motorized steering unit 118 to rotate the sonar transducer corresponding to the yawing movement. In these roll and yaw modes, the motorized steering unit 118 won't necessarily point the sonar transducer in the same direction as the user's fishing rod or gesture remote 116, but when the button is activated they can both turn in unison to allow the user to precisely control where the sonar transducer is pointed. In some configurations, the gesture remote 116 can include one or more buttons or other inputs, including voice controls, to ensure that the motorized steering unit 118 only activated when intended by the user.

In some embodiments, the control of the sonar transducer movement may be proportional to the yaw or roll movement of the gesture remote 116, allowing the transducer to respond directly to the user's motions. Alternatively, the rate of movement does not need to be proportional and can be adjusted differently, where the transducer may move at a fixed or variable rate regardless of the exact movement of the gesture remote. In both cases, the user can customize the sensitivity and level of control, adjusting how quickly or slowly the sonar transducer responds based on their preferences or specific conditions.

When the gesture remote 116 is clipped to a fishing rod, the same yawing and rolling control functionality can be applied using the natural movements of the rod. In this configuration, the gesture remote 116 enables the user to control the motorized steering unit 118 while keeping their focus on the rod. So, for example, if the user is fishing a jig and needs to reposition the sonar transducer to capture movement of the jig, the user can activate the roll mode discussed above, by holding down the activation button for example on the remote, and slightly roll the fishing rod, even while jigging, to cause the motorized steering unit 118 to move the sonar transducer in the direction of the rolling movement. For instance, the user could twist his or her wrist to the right to cause the sonar transducer to pivot to the right. When casting or retrieving, similar movement of the sonar transducer can be achieved through yawing the rod in the desired direction of movement for the sonar transducer. For instance, flipping the tip of the rod to the right can cause the sonar transducer to be pivoted to the right.

The gesture remote 116 can also be clipped to the user, such as the user's hat, shirt, life vest, belt, etc. to automatically move the sonar transducer via the motorized steering unit 118 in the general direction of the user's view. In some configurations, the gesture remote 116 can be configured as a watch, or integrated into a smartwatch or the like, to allow the sonar transducer via the motorized steering unit 118 to move based on the orientation of the user's arm, wrist, and/or hand. The gesture remote 116 can be voice activated or gesture activated so that the motorized steering unit 118 moves the sonar transducer only when instructed or activated by the user. The gesture remote 116 may also be connected to a user's smartphone or other computing device, to allow the smartphone to assist in configuration and operation of gesture controls. In one example, the gesture remote 116 may be integrated into a smartphone, such as in a configuration where the gesture remote 116 is configured as an application running on the user's smartphone, so the user may control the direction and orientation of the sonar transducer via the motorized steering unit 118 by physically pointing (e.g., orienting) the smartphone, using voice control associated with the smartphone, and/or using a touchscreen interface associated with the smartphone.

A gesture activate button can be provided on the gesture remote 116 and/or the foot control switch 146. If the gesture remote 116 was mounted to a hat of a user for example, the user could hold down a gesture activate button on the foot control switch 146 to activate the gesture remote 116. The user could then turn their head to turn the sonar transducer via the motorized steering unit 118 based on data provided by the gesture remote 116. In a number of embodiments, the motorized steering unit 118 can sweep the sonar transducer within a particular number of degrees of a gesture direction, which is the same direction the gesture remote 116 is pointed in, in response to receiving an operational command.

The motorized steering unit 118 can integrate with a multifunction display, such as a chart plotter or sonar display (e.g., sonar display 114), to allow the user to control the operation of the motorized steering unit via the display using Wi-Fi, for example, while simultaneously viewing the output of the sonar transducer. In some examples, the display can include a control bar with a button to enable "Sync" mode. In sync mode, the sonar transducer will move in sync with the gesture remote 116 or a trolling motor. The gesture remote 116 can further include a button to engage in auto target lock mode, trigger a sweep mode, pan the sonar transducer back and forth, and/or a menu button to access additional options and settings.

Additionally, the gesture remote 116 and/or the display can allow the user to select a location, such as a spot on the water, a map, or a chart plotter to lock a waypoint for tracking by the sonar transducer via the motorized steering unit 118. The gesture remote 116 and/or the display can also allow the user to select multiple locations, or a path, to have the sonar transducer sweep in a desired path or over a desired area, such as a shoreline or 180 degrees off the bow of the boat via the motorized steering unit 118. The display or other components of the steerable sonar mounting system can use computer vision algorithms to detect objects within the sonar returns, such as fish, jigs (e.g., lures), underwater structures, etc., and to automatically track those objects.

The processing element 134 may coordinate the positions and heading of the vessel 100 and the trolling motor 150 by receiving input from various sensors, such as a global navigation satellite system (GNSS) receiver, magnetometer, compass, and inertial measurement units (IMUs), which can provide real-time data regarding the vessel's position and heading, as well as the orientation of the trolling motor 150. As the vessel 100 and trolling motor 150 are repositioned due to motor activity, wind, or current, the processing element 134 may adjust the motorized steering unit 118 to help ensure that the sonar transducer 120 stays aligned with the target.

The user can select an underwater location, such as the position of an underwater structure, directly from a displayed sonar image on the multifunction display (e.g., display 101 or sonar display 114). Once the location is selected, the processing element 134 may control the motorized steering unit 118 to adjust the orientation of the sonar transducer 120, ensuring it remains focused on the selected object. As the vessel 100 and/or trolling motor 150 moves due to motor activity, wind, or current, the processing element 134 can continuously adjust the motorized steering unit 118 to maintain the sonar transducer 120's focus on the object. This allows the sonar transducer 120 to track the selected location regardless of the vessel's or trolling motor's movement.

The processing element 134 can process this data and calculate any necessary adjustments to the motorized steering unit 118, compensating for changes in the vessel's position or heading. These adjustments may be made by rotating the motorized steering shaft to keep the sonar transducer 120 oriented towards the target, allowing it to continue tracking the target despite movement of the vessel 100 or trolling motor 150.

In one example, the display or related computing device may have computer vision capabilities, such as by coupling with a camera, to monitor the position and facing orientation of the angler as he or she fishes. By optically monitoring the angler, the display can control the motorized steering unit 118 to automatically orient the sonar transducer to capture the area being fished by the angler, without requiring the angler to remember to activate any controls. The computer vision capabilities of the display may be augmented by the gesture remote 116 described above, such as by combining sensor information from the gesture remote 116 with the optically-identified position and orientation of the angler to ensure the motorized steering unit 118 captures the correct area of water with the sonar transducer. For instance, the display may determine that the angler is actively fishing, such as by using object recognition or image segmentation to identify the presence of a fishing rod being held by the angler, and then use the gesture remote 116 data and pose estimation algorithms to determine the relative angle and position of where the angler is fishing for control of the sonar transducer.

Figure 8:
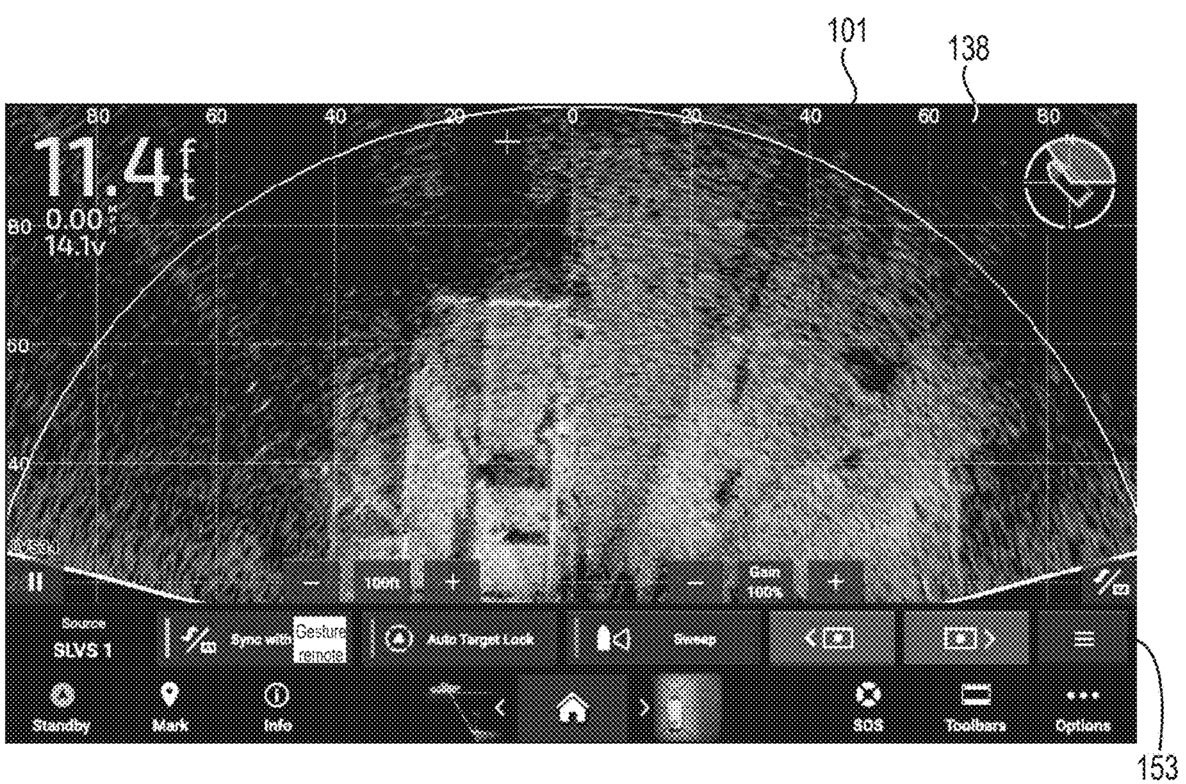
FIG. 8 illustrates an example of a display showing an underwater image stream and a control bar.

FIG. 8 illustrates an example of a display 101 showing an underwater image stream 138 and a control bar 153. The underwater image stream 138 can be generated from data derived from electronic signals output by a sonar transducer. The sonar transducer can transmit a sonar beam that reflects off objects in the water and returns to the transducer which outputs the corresponding electronic signal.

The control bar 153 can include a number of buttons. For example, the control bar 153 can include a button to enable "Sync" mode. In sync mode, the sonar transducer can move in sync with the gesture remote or a trolling motor.

Figure 9:
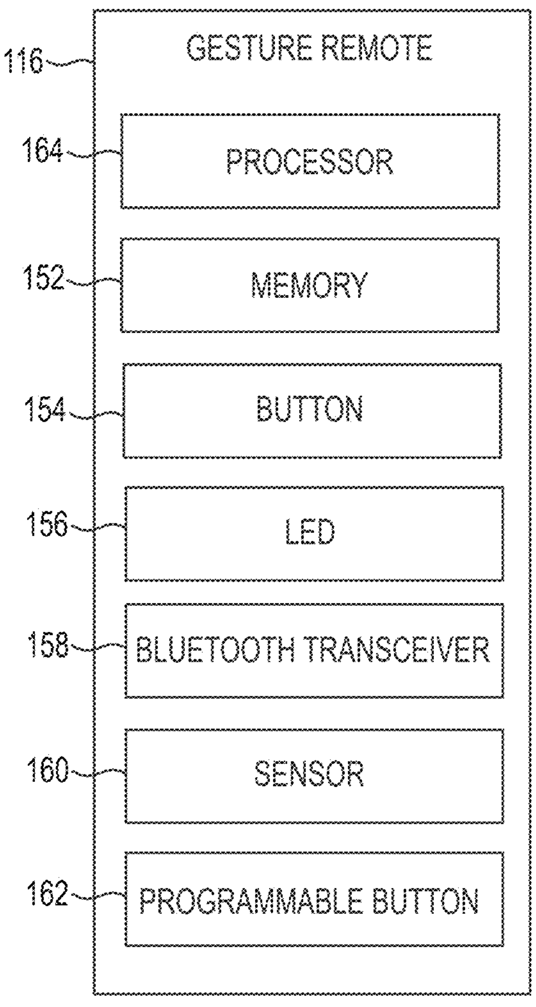
FIG. 9 is a block diagram illustrating a gesture remote.

FIG. 9 is a block diagram illustrating a gesture remote 116. The gesture remote 116 can include a processor 164, a memory 152, a button 154, an LED 156, a Bluetooth transceiver 158, a sensor 160, and a programmable button 162.

The processor 164 can execute one or more software programs embodied in a non-transitory computer readable medium (e.g., memory 152) that implement techniques described herein including receiving a user command for a sonar transducer to point in a same direction as the gesture remote 116, determining a gesture direction the gesture remote 116 is pointing in based on data from the sensor 160 (or otherwise determining other gesture movement, such as rolling, yawing, etc.) in response to the user command, and transmitting an indication of the gesture movement.

The indication of gesture movement can include various types of data that represent different aspects of the gesture remote 116's motion. For example, the data could include the instantaneous direction of the remote, such as its current yaw or roll angle, indicating its orientation in space. This would allow the motorized steering unit 118 to align the sonar transducer based on the remote's pointing direction. Additionally, the data could represent the velocity of the gesture remote 116, such as how quickly it is yawing or rolling, providing a measure of the rate of change in its orientation. Acceleration data could also be included, indicating how rapidly the gesture remote 116 is increasing or decreasing its movement in any given axis. These different types of data-direction, velocity, and acceleration—can be used independently or together to control the sonar transducer with varying levels of precision and responsiveness. The indication of gesture movement can include data for all six degrees of freedom, allowing the motorized steering unit 118 to respond to both translational and rotational movements of the gesture remote 116. For example, the sonar transducer can yaw or roll based on the remote's rotation, while linear movements along the x, y, or z axes can adjust the transducer's position or range.

Further, the processor 164 can continuously determine the gesture direction and the motorized steering unit can continuously point the sonar transducer in the gesture direction in response to receiving the gesture direction.

In some examples, the processor 164 can receive a user command for the sonar transducer to point in a same direction as the gesture remote 116 or sweep within a particular number of degrees of the gesture direction the gesture remote 116 is pointing in. The processor 164 can transmit the operational command to sweep the sonar transducer within the particular number of degrees of the gesture direction. In a number of embodiments, the processor 164 can transmit an operational command to the motorized steering unit to perform a yaw rotation of the sonar transducer in response to receiving a roll rotation of the gesture remote 116.

The memory 152 can be a tangible, computer-readable storage medium that provides storage functionality to store various data and/or program code associated with an operation, such as software programs and/or code segments, or other data to instruct the processor 164, and possibly other components of the gesture remote 116, to perform the functionality described herein. The memory 152 can store data, such as program instructions for operating the gesture remote 116 including its components, and so forth. The memory 152 can also store data from the sensor 160.

A motorized steering unit can be coupled to a sonar transducer and communicatively coupled to the gesture remote 116. The motorized steering unit can be configured to point the sonar transducer in the gesture direction in response to receiving the gesture direction from the gesture remote 116. Further, the motorized steering unit can continuously point the sonar transducer in the continuously determined gesture direction of the gesture remote 116.

The button 154 can activate the gesture remote 116. Activating the gesture remote 116 can include powering on or changing the state of the gesture remote 116 from standby to active, for example. When activated, the gesture remote 116 can receive and transmit data and/or commands. The LED 156 can emit light to convey a feedback status including whether the gesture remote 116 is activated.

The programmable button 162 can transmit an operational command to the motorized steering unit. For example, in response to receiving a selection of the programmable button 162, the processor 164 can receive a user command, and the gesture remote 116 can transmit an operational command to the motorized steering unit to sweep the sonar transducer 360 degrees or perform a stern side sweep, a starboard side sweep, a port side sweep, or a bow side sweep. The gesture remote 116 can transmit an operational command to a marine vessel motor to maintain a bow of the marine vessel pointing in a vessel direction in response to receiving the selection of the programmable button 162. In a number of embodiments, an operational command to deploy a shallow water anchor can be transmitted in response to receiving the selection of the programmable button 162. In some examples, the processor can receive a different user command in response to the programmable button 162 being reprogrammed and the programmable button 162 receiving a selection.

Sensor 160 can be a global navigation satellite system (GNSS) receiver, a heading sensor, or a magnetometer, for example. The sensor 160 can transmit data to the processor 164 and the processor 164 can use the data to determine a gesture direction the gesture remote 116 is pointing in.

Figure 10:
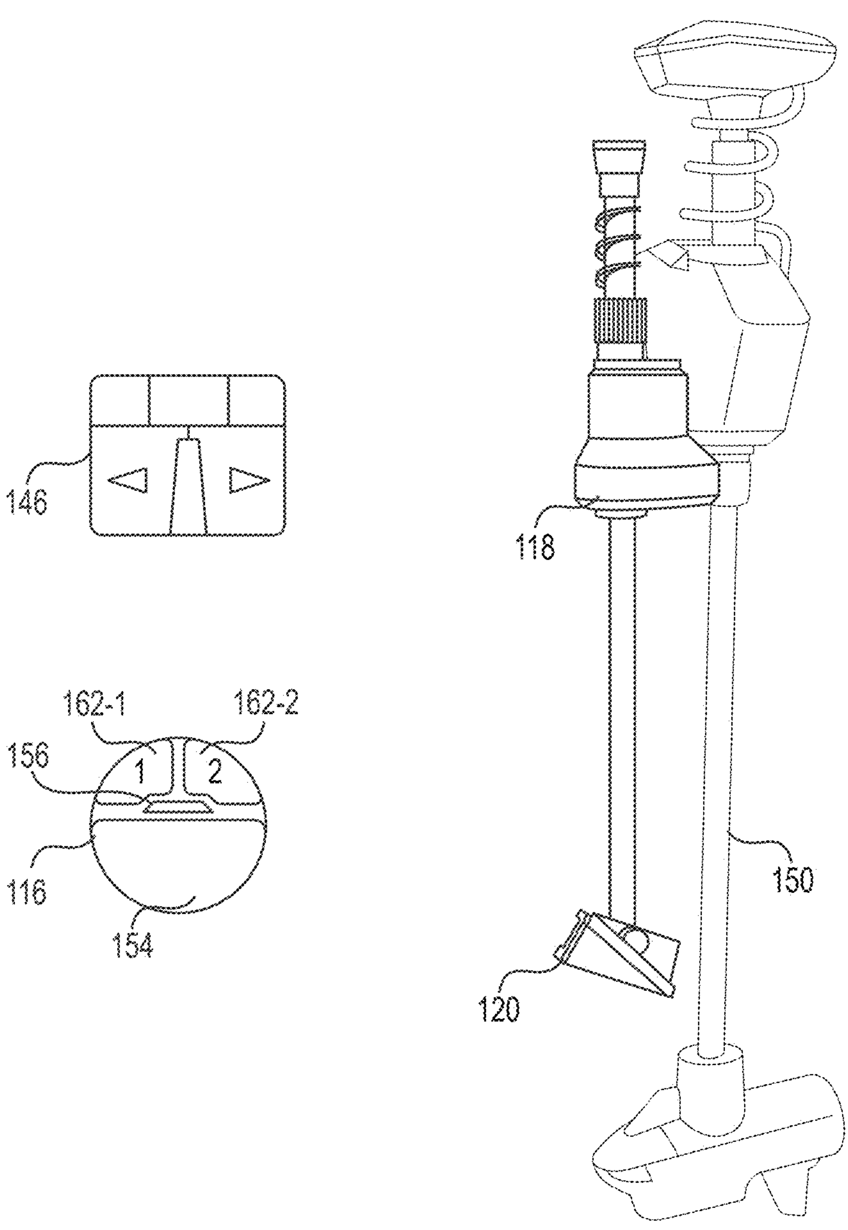
FIG. 10 illustrates a steerable sonar mounting system.

FIG. 10 illustrates a steerable sonar mounting system. The steerable sonar mounting system can include a gesture remote 116, a motorized steering unit 118, a sonar transducer 120, and/or a foot control switch 146.

As previously discussed, the gesture remote 116 and the foot control switch 146 can each include a number of buttons. For example, the gesture remote 116 can include a button 154 to activate the gesture remote 116 and a number of programmable buttons 162-1, 162-2. The gesture remote 116 can further include an LED 156 to convey a feedback status.

The gesture remote 116 can transmit a gesture direction to the motorized steering unit 118 and the motorized steering unit 118 can point the sonar transducer 120 in the gesture direction in response to receiving the gesture direction.

Figure 11A:
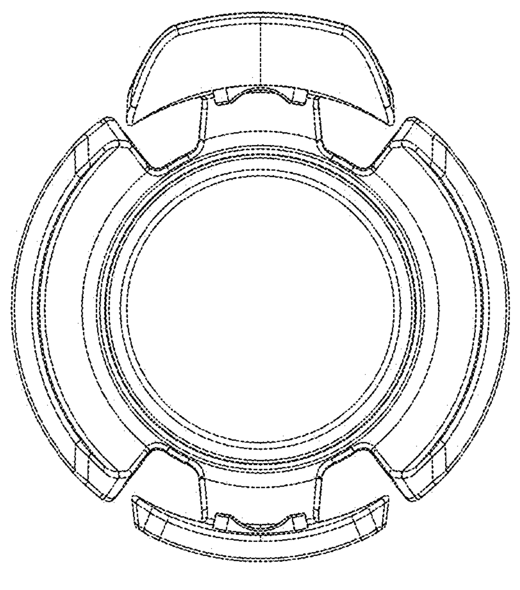
FIGS. 11A-11C illustrate a number of views of an attachment portion.
Figure 11B:
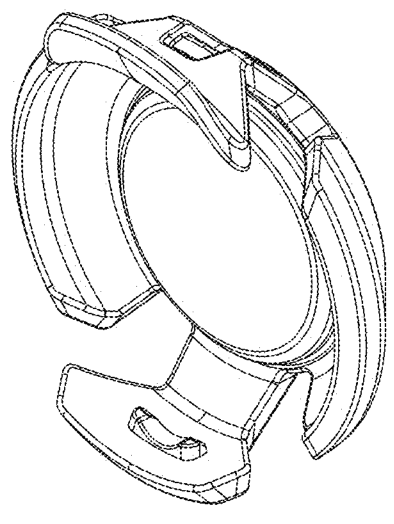
Figure 11C:
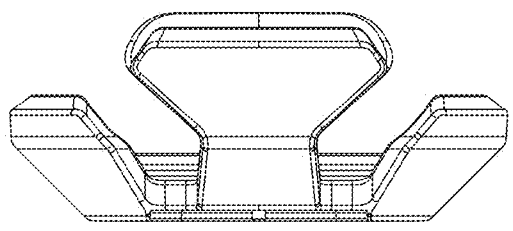

FIGS. 11A, 11B, and 11C illustrate a number of views of an attachment portion. The attachment portion is configured to removably couple to a gesture remote (e.g., gesture remote 116 in FIGS. 6, 7, 9, and 10). Further, the attachment portion can couple the gesture remote to a garment or a fishing rod. For example, the attachment portion can couple the gesture remote to a hat, a watch, a lanyard, a shirt, a life vest, a belt, and/or a portion of a marine vessel.

In a number of embodiments, the attachment portion can orient the gesture direction the gesture remote is pointing in to match a rod direction the fishing rod is pointing in. For example, the attachment portion can receive the gesture remote and align the gesture remote with the fishing rod so that the sensor 160 is pointing north when the fishing rod is pointing north. The motorized steering unit 118 can automatically reposition the sonar transducer 120 as the user moves around the vessel 100 to fish in different areas, without requiring direct user input. The system may use filtering and logic to determine the actual fishing direction by analyzing data from the gesture remote 116 and sensors 160 attached to the fishing rod. These sensors may detect the rod's general orientation, while filtering algorithms ignore irrelevant movements such as casting, reeling, or other temporary actions. The processing element 134 can use this data to determine the direction where the user is actively fishing and adjust the motorized steering unit 118 to orient the sonar transducer 120 accordingly.

Similarly, the attachment portion can orient the gesture direction the gesture remote is pointing in to match a hat direction a brim of a hat is pointing in. Assuming a hat is worn with the brim forward, the brim of the hat along with the gesture remote will move to point in the same direction as the direction the user is looking in.

Figure 12A:
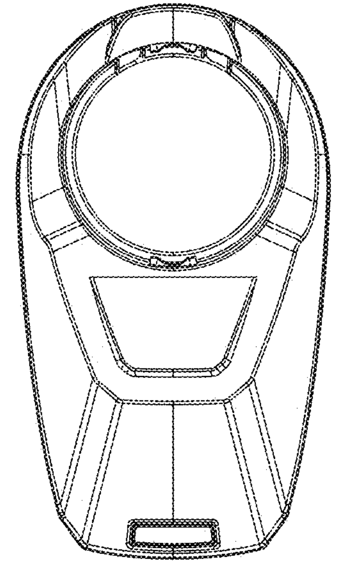
FIGS. 12A-12B illustrate a number of views of an attachment portion as a lanyard.
Figure 12B:
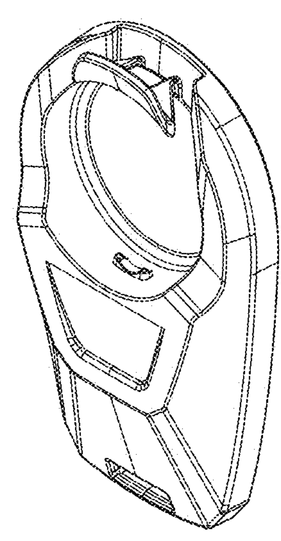

FIGS. 12A-12B illustrate a number of views of an attachment portion as a lanyard. The attachment portion can include a cavity configured to receive a gesture remote (e.g., gesture remote 116 in FIGS. 6, 7, 9, and 10). The gesture remote can be removably coupled to the attachment portion. The attachment portion as a lanyard can include an opening configured to receive a cord or a string. The cord or string can be looped around a user's neck or wrist to prevent the user from losing the gesture remote, for example.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and methods are used. Therefore, the scope of one or more embodiments of the present disclosure should be determined with reference to the appended claims, along with the full range of equivalents to which such claims are entitled.

As used herein, "a number of" something can refer to one or more of such things. As will be appreciated, elements shown in the various embodiments herein can be added, exchanged, and/or eliminated so as to provide a number of additional embodiments of the present disclosure.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A steerable sonar mounting system comprising:
- a sonar transducer;
- a gesture remote comprising:
  - a sensor;
  - a memory; and
  - a processor coupled to the memory and the sensor, wherein the processor is configured to:
    - receive a user command for the sonar transducer to be repositioned based on movement of the gesture remote;
    - determine a gesture movement corresponding to the gesture remote based on data from the sensor, wherein the gesture movement comprises a rolling movement of the gesture remote about a longitudinal axis of the gesture remote; and
    - transmit an indication of the gesture movement; and
- a motorized steering unit coupled to the sonar transducer and communicatively coupled to the gesture remote, the motorized steering unit comprising:
  - a motor; and
  - a drive mechanism coupled to the motor and to a rotatable shaft on which the sonar transducer is mounted, the drive mechanism configured to control rotation of the rotatable shaft about the vertical axis,
  - wherein the motor and drive mechanism define a dedicated steering assembly for the sonar transducer;
  - wherein the motorized steering unit is configured to rotate the rotatable shaft about the vertical axis by an amount corresponding to a change in the rolling movement of the gesture remote to change a viewing direction of the sonar transducer relative to the marine vessel.

2. The system of claim 1, wherein the processor is configured to continuously determine changes in the rolling movement of the gesture remote and the motorized steering unit is configured to adjust rotation of the rotatable shaft in response to the determined changes.

3. The system of claim 1, wherein the gesture remote further comprises a button configured to activate the gesture remote.

4. The system of claim 1, wherein the gesture remote further comprises a light-emitting diode (LED) configured to emit light to convey a feedback status.

5. The system of claim 1, wherein the processor is configured to operate in a first mode in which the rolling movement controls rotation of the rotatable shaft and in a second mode in which the processor determines that the gesture movement is at least one of a pointing direction and a yawing movement of the gesture remote.

6. The system of claim 1, wherein the processor is configured to transmit an operational command to the motorized steering unit to sweep the sonar transducer 360 degrees in response to receiving a selection of a programmable button on the gesture remote.

7. The system of claim 1, wherein the processor is configured to transmit an operational command to the motorized steering unit to perform a stern side sweep, a starboard side sweep, a port side sweep, or a bow side sweep with the sonar transducer in response to receiving a selection of a programmable button on the gesture remote.

8. The system of claim 1, wherein the processor is configured to transmit an operational command to the motorized steering unit to maintain the sonar transducer pointing in its current direction in response to receiving a selection of a programmable button on the gesture remote.

9. The system of claim 1, wherein the processor is configured to transmit an operational command to a marine vessel motor to maintain a bow of the marine vessel pointing in a vessel direction in response to receiving a selection of a programmable button on the gesture remote.

10. The system of claim 1, wherein the processor is configured to transmit an operational command to deploy a shallow water anchor in response to receiving the selection of a programmable button on the gesture remote.

11. The system of claim 1, further comprising an attachment portion configured to removably couple the gesture remote to a fishing rod.

12. A steerable sonar mounting system comprising:
- a sonar transducer;
- a gesture remote comprising:
  - an attachment portion configured to couple the gesture remote to a fishing rod;
  - a sensor;
  - a memory; and
  - a processor coupled to the memory and the sensor, wherein the processor is configured to:
    - receive a user command for the sonar transducer to be repositioned based on movement of the gesture remote;
    - determine a gesture movement corresponding to the gesture remote based on data from the sensor; and
    - transmit an indication of the gesture movement; and a motorized steering unit coupled to the sonar transducer and communicatively coupled to the gesture remote, the motorized steering unit comprising:

a motor; and a drive mechanism coupled to the motor and to a rotatable shaft on which the sonar transducer is mounted, the drive mechanism configured to control rotation of the rotatable shaft about the vertical axis, wherein the motor and drive mechanism define a dedicated steering assembly for the sonar transducer;

wherein the processor is configured to operate the steerable sonar mounting system in a first operating mode and a second operating mode, wherein in the first operating mode the gesture movement comprises a rolling movement of the gesture, and the motorized steering unit rotates the rotatable shaft about the vertical axis by an amount corresponding to a change in the rolling movement to change a viewing direction of the sonar transducer relative to the marine vessel; and wherein in the second operating mode the gesture movement comprises a yawing movement of the gesture remote, and the motorized steering unit rotates the rotatable shaft about the vertical axis by an amount corresponding to a change in the yawing movement to change the viewing direction of the sonar transducer relative to the marine vessel.

13. The system of claim 12, wherein the gesture remote further comprises a programmable button configured to receive a selection from the user, wherein the processor is configured to receive the user command in response to receiving the selection from the user.

14. The system of claim 13, wherein the processor is configured to receive a different user command in response to the programmable button being reprogrammed and the programmable button receiving another selection.

15. The system of claim 12, wherein the motorized steering unit rotates the rotatable shaft about the vertical axis to move the sonar transducer a proportional amount corresponding an amount of the determined gesture movement.

* * * * *